United States Patent
Domejean et al.

(10) Patent No.: US 12,542,435 B2
(45) Date of Patent: Feb. 3, 2026

(54) SEMI-CONDUCTOR CIRCUIT BREAKER WITH OVERVOLTAGE PROTECTION

(71) Applicant: Schneider Electric Industries SAS, Rueil Malmaison (FR)

(72) Inventors: Eric Domejean, Voreppe (FR); Jérôme Brenguier, L'Albenc (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 152 days.

(21) Appl. No.: 18/510,874

(22) Filed: Nov. 16, 2023

(65) Prior Publication Data
US 2024/0178652 A1      May 30, 2024

(30) Foreign Application Priority Data

Nov. 24, 2022   (FR) ...................................... 2212296

(51) Int. Cl.
*H02H 3/20*         (2006.01)
(52) U.S. Cl.
CPC ..................... *H02H 3/20* (2013.01)
(58) Field of Classification Search
CPC ........ H02H 3/20; H02H 3/202; H01H 33/596; H01H 2009/543; H01H 2009/544; H01H 9/548
See application file for complete search history.

(56) References Cited

U.S. PATENT DOCUMENTS

| | | | |
|---|---|---|---|
| 9,373,473 B2 * | 6/2016 | Dupraz ................. | H01H 9/548 |
| 2013/0021708 A1 * | 1/2013 | Demetriades .......... | H02H 3/023 361/102 |
| 2015/0002977 A1 | 1/2015 | Dupraz et al. | |
| 2016/0285250 A1 * | 9/2016 | Lee .......................... | H01H 9/54 |
| 2016/0322809 A1 * | 11/2016 | Wang ..................... | H02H 9/02 |
| 2022/0014185 A1 * | 1/2022 | Handt .................... | H02H 3/087 |
| 2022/0115857 A1 * | 4/2022 | Zhou ..................... | H01H 9/30 |
| 2025/0080110 A1 * | 3/2025 | Yun ................... | H03K 17/08142 |

FOREIGN PATENT DOCUMENTS

| | | | |
|---|---|---|---|
| CN | 111640602 A | 9/2020 | |
| EP | 3057117 A1 | 8/2016 | |
| WO | 2013092873 A1 | 6/2013 | |
| WO | WO-2025011797 A1 * | 1/2025 | ......... H03K 17/0814 |

OTHER PUBLICATIONS

French Search Report and Written Opinion dated May 31, 2023 for corresponding French Patent Application No. 2212296, 6 pages.

* cited by examiner

*Primary Examiner* — Danny Nguyen
*Assistant Examiner* — Nicolas Bellido
(74) *Attorney, Agent, or Firm* — Kinney & Lange, P.A.

(57) ABSTRACT

An electrical circuit breaker with overvoltage protection includes a pair of connection terminals, a main semiconductor switch including at least one semiconductor component and a pair of separable contacts forming a disconnector connected in series with the main semiconductor switch between the connection terminals. The electrical circuit breaker also includes a first protection system connected in parallel with the main switch, the first protection system including a first protection device including a varistor and a first switch connected in series with the first protection device. The electrical circuit breaker further includes a second protection system, connected in parallel with the first protection system and said the main semiconductor switch, the second protection system including a second protection device including a transient voltage suppression diode.

10 Claims, 9 Drawing Sheets

SEMI-CONDUCTOR CIRCUIT BREAKER WITH OVERVOLTAGE PROTECTION

TECHNICAL FIELD

The present invention relates to an electrical circuit breaker with overvoltage protection, and to an associated electrical circuit-breaking method.

The invention applies in particular to static semiconductor circuit breakers, in particular of the SSCB (solid state circuit breaker) or SCCB (semiconductor circuit breaker) type.

This type of static circuit breaker is advantageously able to be used in DC electrical distribution systems. Indeed, in such systems, an electrical fault causes a rapid rise in the current to a very high level, and very rapid breaking is necessary. In addition, such a static circuit breaker has advantages in the event of high AC current, or for attenuating electric arcs.

BACKGROUND

A circuit breaker of the aforementioned type, also known as a semiconductor circuit breaker, comprises in particular a main semiconductor switch, comprising, for example, at least one field-effect, MOSFET or JFET transistor, or insulated-gate bipolar transistor (IGBT). It also includes a disconnector, which performs the function of a main switch.

Semiconductor circuit breakers that are configured to be controlled according to three states, which are, respectively: a closed state, or "ON", in which the circuit breaker allows the current to flow between the connection terminals between which it is connected; an open state, or "OFF", in which the main switch and the disconnector are open and the electric current does not flow between the connection terminals; and a passive waiting state, or "STANDBY", in which the main switch is open but the disconnector is closed, are known.

Semiconductor components must be protected against overvoltages, particularly in the "ON" and "STANDBY" states of the circuit breaker.

It is known practice to associate a varistor protection device, for example a varistor composed of metal oxides, or MOV (for "metal oxide varistor"), which is connected in parallel with the main semiconductor switch and capable of withstanding very high energy, and therefore of providing protection in the event of an electrical fault causing the tripping, with the main semiconductor switch. This type of protection device is effective for protection in the event of a high one-time overvoltage, for example in the case of breaking or tripping (changeover from the "ON" state to the "OFF" state) or in the case of changeover from the "ON" state to the "STANDBY" state. When the disconnector is closed, in the passive waiting state "STANDBY", it is also necessary to avoid damage to the varistor in the event of an overvoltage, in particular an overvoltage coming from the electrical distribution network to which the static circuit breaker is connected.

In addition, it is also necessary to ensure the protection of the main semiconductor switch when the circuit breaker is in the "STANDBY" state in the event of an excessive overvoltage.

SUMMARY

To this end, the invention proposes, according to one aspect, an electrical circuit breaker with overvoltage protection, comprising a pair of connection terminals, a main semiconductor switch comprising at least one semiconductor component and a pair of separable contacts forming a disconnector connected in series with the main semiconductor switch between the connection terminals. This electrical circuit breaker comprises a first protection system connected in parallel with the main switch, the first protection system comprising a first protection device comprising a varistor and a first switch connected in series with the first protection device, and a second protection system, connected in parallel with said first protection system and said main semiconductor switch, the second protection system comprising a second protection device comprising a transient voltage suppression diode.

Advantageously, the proposed circuit breaker comprises two protection systems connected in parallel with the main semiconductor switch, the first protection system comprising a varistor and the second protection circuit comprising a transient voltage suppression diode, which makes it possible to ensure complete protection of the main semiconductor switch and the varistor against overvoltages, especially in the passive waiting state "STANDBY".

The circuit breaker according to the invention may have one or more of the characteristics below, taken independently or according to all acceptable combinations.

The second protection system further comprises a second switch connected in series with the second protection device.

The second switch of the second protection system is of thyristor type, comprising two thyristors connected in parallel and in opposition.

The second switch of the second protection system comprises at least one JFET field-effect transistor.

The device further comprises an electronic controller connected to the main semiconductor switch and a module for measuring current flowing between the connection terminals, the electronic controller being configured to switch the main semiconductor switch from a closed state to an open state when the current measured by the current measurement module exceeds a predetermined cut-off current threshold.

The electronic controller is further configured to control said first switch of the first protection system, and, when the second protection system further comprises a second switch, said electronic controller is further configured to control said second switch.

The first switch of the first protection system comprises two thyristors connected in parallel and in opposition.

The main semiconductor switch comprises at least one insulated-gate field-effect or bipolar transistor.

According to another aspect, the invention relates to an electrical circuit-breaking method, implemented by a circuit breaker, as briefly described above, comprising, when the circuit breaker is in a closed state in which an electric current flows between the connection terminals:

upon reception of a remote control or when said electric current flowing between the connection terminals exceeds a predetermined cut-off current threshold, switching of the main switch from a closed state to an open state, inducing a flow of electric current via the first protection system, then, when the electric current is lower than the predetermined cut-off current threshold, control to open the first switch of the first protection system, and, in the event of a second switch being present in the second protection system, control to close said second switch, the circuit breaker then being in a passive waiting state.

According to one embodiment, the method comprises, starting from the passive waiting state of the circuit breaker, upon reception of a remote control or a manual control to open the circuit breaker, opening of the disconnector, and, in the event of a second switch being present, opening of the second switch, the circuit breaker then being in an open state.

According to one embodiment, the method comprises, upon reception of a manual control or a remote control to close the circuit breaker, changeover of the circuit breaker from the open state to the passive waiting state by closing of the disconnector and, in the event of a second switch being present, closing of the second switch, then, upon reception of a control, or automatically, changeover of the circuit breaker from the passive waiting state to the closed state, by control to close the main switch and the first switch of the first protection system, and, in the event of a second switch being present, control to open the second switch.

BRIEF DESCRIPTION OF THE DRAWINGS

Other features and advantages of the invention will emerge from the description thereof given below, by way of completely nonlimiting indication, with reference to the appended figures, among which.

DETAILED DESCRIPTION

Figure 1:
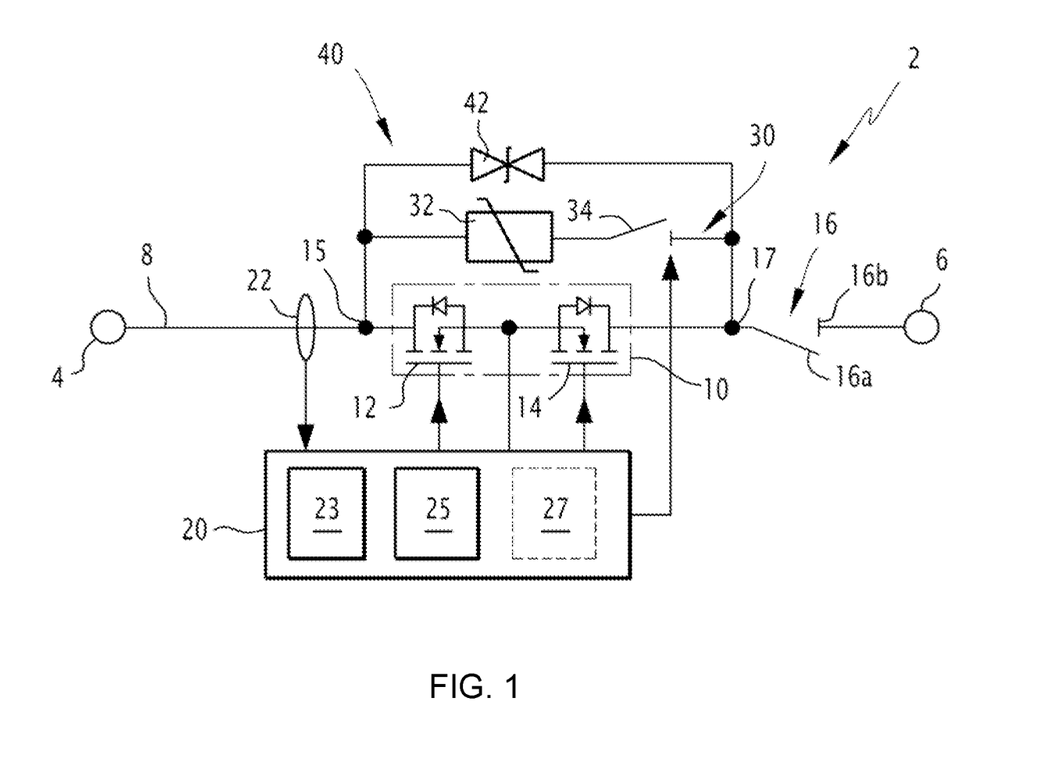
FIG. 1 schematically shows a circuit breaker according to a first embodiment.

FIG. 1 shows an electrical circuit breaker 2, comprising a pair of connection terminals 4, 6, these connection terminals being intended to be each connected to an electrical conductor of an electrical circuit (not shown).

For example, one of the connection terminals is connected to the electrical distribution network, and the other connection terminal is connected to an electrical load.

It is clear to a person skilled in the art that a circuit breaker 2 represents a single connection pole and can be adapted for a single-phase or polyphase installation, for example comprising three phase conductors and a neutral conductor. The number of circuit breakers per connection terminal 4, 6 is adapted according to the number of phases.

The circuit breaker 2 comprises a main current conductor 8 between the connection terminals 4 and 6.

A main semiconductor switch 10 is connected between a first connection point 15 and a second connection point 17 of the main conductor 8.

In the example shown, the main semiconductor switch 10 comprises semiconductor components 12, 14, which in this case are two transistor switches 12, 14, connected in series in different directions, for example field-effect, MOSFET or JFET transistors, or insulated-gate bipolar transistors (IGBT), each transistor having an operating rating chosen according to the current, the voltage and the maximum tolerated losses.

Of course, this main semiconductor switch 10 can comprise, according to some variants, a different number of transistors, in parallel or in series.

The circuit breaker 2 further comprises a disconnector 16, which comprises two separable contacts 16a, 16b. This disconnector 16 is able to be actuated to change over from an open state, in which the contacts 16a and 16b are separated, the flow of electric current between the connection point 17 and the terminal 6 then being cut off, to a closed state, in which the contacts 16a, 16b are joined, and therefore allow an electric current to flow between the connection point 17 and the connection terminal 6. In other words, the disconnector 16 performs the function of a main switch.

The circuit breaker 2 further comprises an electronic controller 20, which is a programmable unit comprising a processor 23 and a memory 25, and which is designed to execute code instructions.

The controller 20 is, as a variant, formed by a dedicated integrated circuit (application-specific integrated circuit), by a set of programmable logic components, or even by any set of electronic components.

The controller 20 is configured to communicate with a current measurement module 22, for example a current sensor 22 designed to periodically measure (sample) current intensity values in the main conductor 8, the controller 20 being configured to receive digital values of measured current intensity.

In addition, the controller 20 is configured to implement a method of monitoring the current intensity, and to control the opening or closing of the various switching or breaking members of the circuit breaker 2.

The controller 20 is in particular configured to control opening of the transistor switches of the main switch 10 when the measured current intensity exceeds a predetermined cut-off current threshold.

In addition, the controller 20 is configured to control the opening of the disconnector 16.

Optionally, the controller 20 comprises a communication interface 27, for example a radio communication interface. In this case, the controller 20 is designed to receive controls from an external device (not shown), for example from a remote control unit, thus making it possible to remotely control the change of state of the circuit breaker 2, in particular the changeover from the "ON" state to the "STANDBY" state and possibly vice versa, from the "STANDBY" state to the "OFF" state.

The circuit breaker 2 also comprises a first protection system 30 connected in parallel with the main switch 10 and a second protection system 40 connected in parallel with the main switch 10.

The first protection system 30 comprises a varistor protection device 32, which comprises, for example, a varistor composed of metal oxides, also called MOV (for "metal oxide varistor"), connected in series with a first switch 34.

The first protection system 30 is connected in parallel with the main switch 10, between the connection points 15 and 17. In other words, the first protection device 32 is connected between the connection point 15 and an input of the first switch 34, and an output of the first switch 34 is connected to the connection point 17.

In some embodiments, the varistor protection device 32 is voltage-rated so as not to exceed the breakdown voltage of the semiconductors 12, 14 with the maximum current obtained in the event of a short circuit (typically 500 V or 1000 V if 750 V or 1.2 kV semiconductors for a current of 10 times the nominal current of the circuit breaker 2) or power-rated to tolerate the maximum power stored in the inductive elements of the circuit protected by the circuit breaker and which will need to be dissipated (typically 10 to 100 joules).

The second protection system 40 comprises, in the embodiment of FIG. 1, a transient voltage suppression, or TVS, diode protection device 42.

In some embodiments, the transient voltage suppression diode protection device 42 is voltage-rated so as not to exceed the breakdown voltage of the semiconductors 12, 14 with the maximum current obtained in the event of a lightning-type transient overvoltage (typically 600 V or 1100 V if 750 V or 1.2 kV semiconductors for a current of 2 or 4 kA) or power-rated to tolerate the current and voltage during a lightning-type wave lasting approximately 50 μs.

Figure 2:
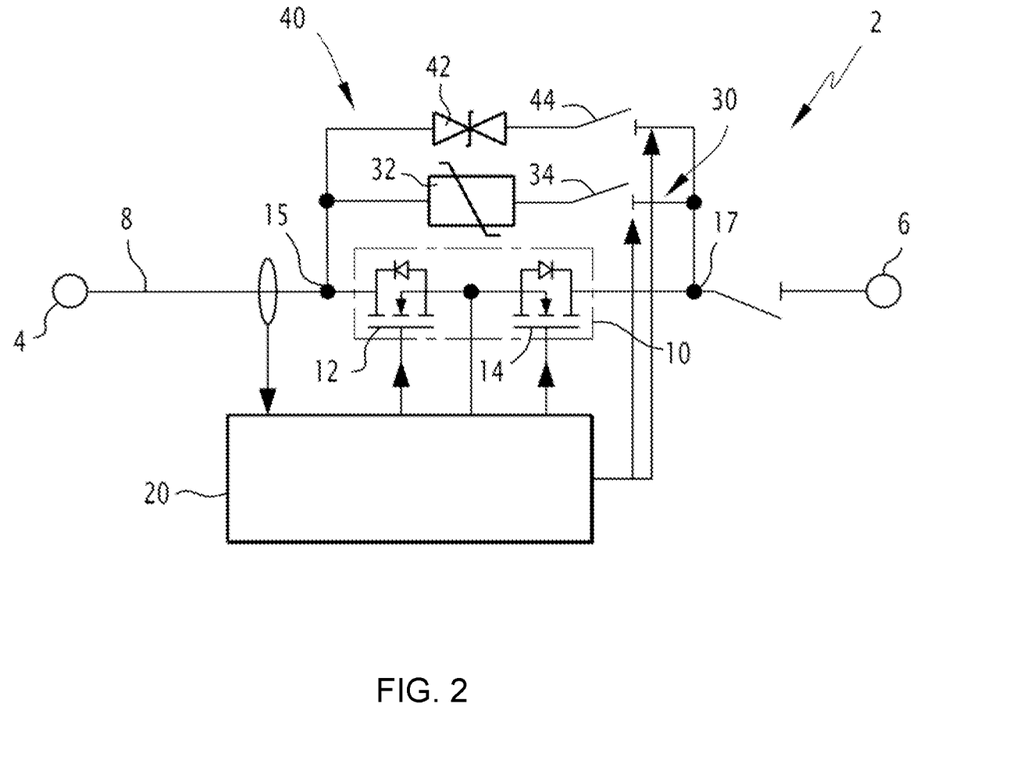
FIG. 2 schematically shows a circuit breaker according to a second embodiment.

In a second embodiment, shown schematically in FIG. 2, the circuit breaker 2 further comprises, in the second protection system 40, a second switch 44 connected in series with the transient voltage suppression diode protection device 42.

The second protection system 40 is connected in parallel with the main switch 10, between the connection points 15 and 17. In other words, the protection device 42 is connected between the connection point 15 and an input of the second switch 44, and an output of the second switch 44 is connected to the connection point 17.

The first switch 34 and the second switch 44 are, for example, thyristor switches.

Figure 3:
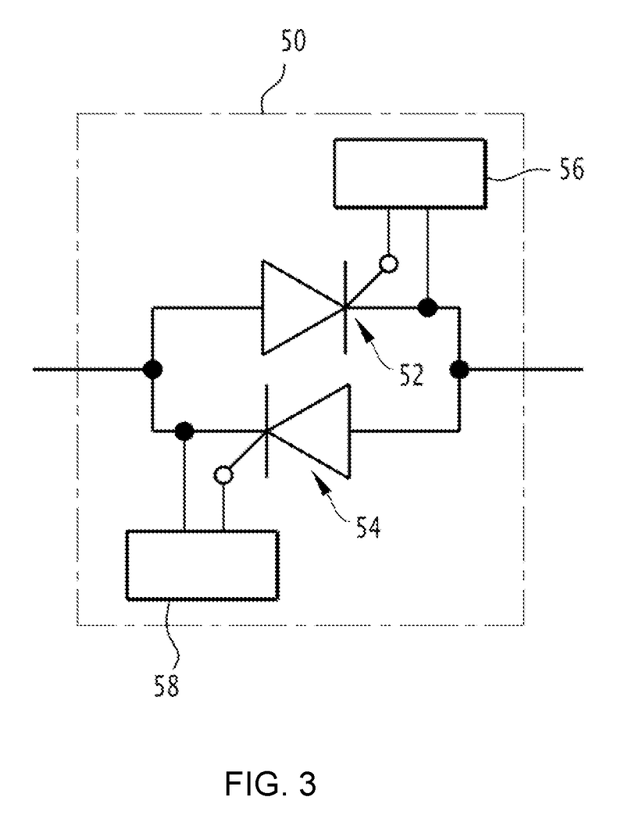
FIG. 3 schematically shows an embodiment of a first switch and a second switch of FIG. 2.

In one embodiment, the first switch 34 and the second switch 44 are both produced in the form of a switch 50 with two opposing thyristors, according to the embodiment shown schematically in FIG. 3.

A thyristor switch 50 comprises, in the embodiment of FIG. 3, a first thyristor 52 and a second thyristor 54, the first thyristor 52 being controlled by a control module 56 and the second thyristor 54 being controlled by a control module 58.

In the circuit breaker 2, the control module 58 of each of the switches is controlled by the controller 20. In other words, the controller 20 is configured to control the state of the first switch 34 and the second switch 44.

Advantageously, a thyristor switch 50 is inexpensive and robust.

Advantageously, a thyristor switch 50 automatically changes over to the open mode ("OFF") when the intensity of the current passing through it changes to zero.

Figure 4:
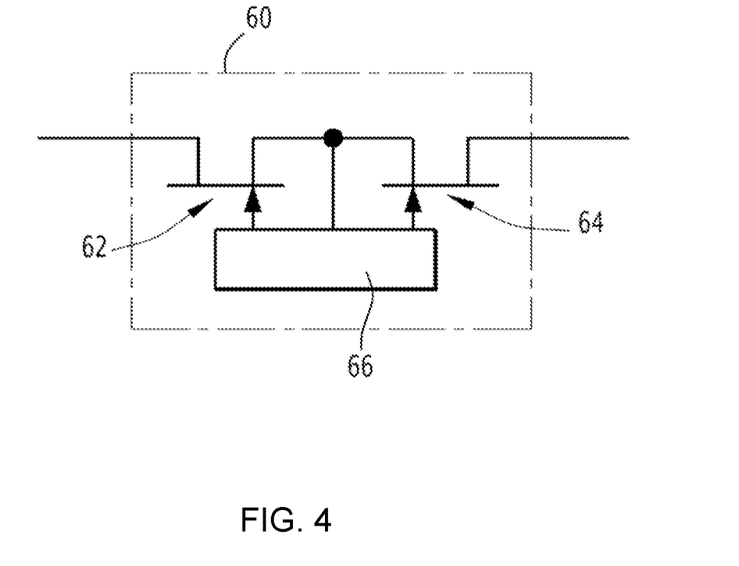
FIG. 4 schematically shows another embodiment of the second switch of FIG. 2.

According to one variant, the second switch 44 is of the JFET field-effect transistor switch type, as shown schematically in FIG. 4.

Such a field-effect transistor switch, which is shown schematically in FIG. 4 with the reference sign 60, comprises two field-effect transistors 62, 64 and a control module 66.

In the circuit breaker 2, when the second switch 44 is of the type shown in FIG. 4, the control module 66 is controlled by the controller 20. In other words, the controller 20 is configured to control the state of the second switch 44.

Advantageously, such a switch 60 is normally closed, which makes it possible to protect the semiconductors.

The circuit breaker 2 is preferably integrated in a dedicated casing.

Figure 5:
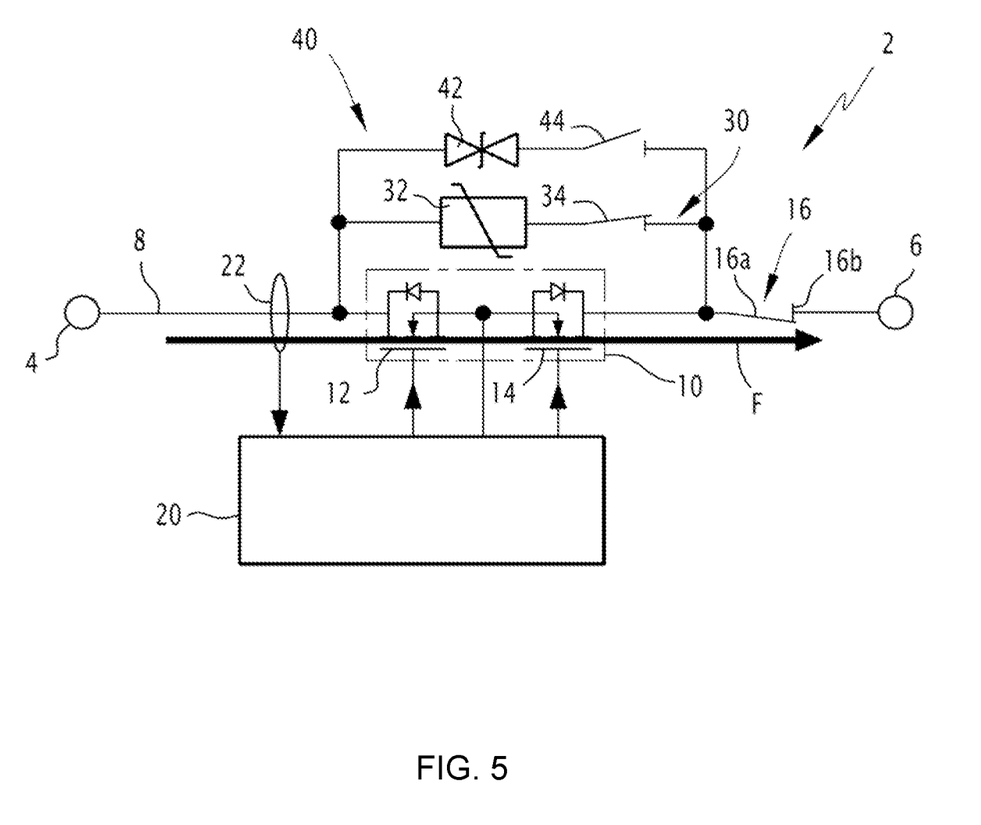
FIGS. 5, 6 and 7 show the states of the switches and the flow of electric current in various states of the circuit breaker.
Figure 6:
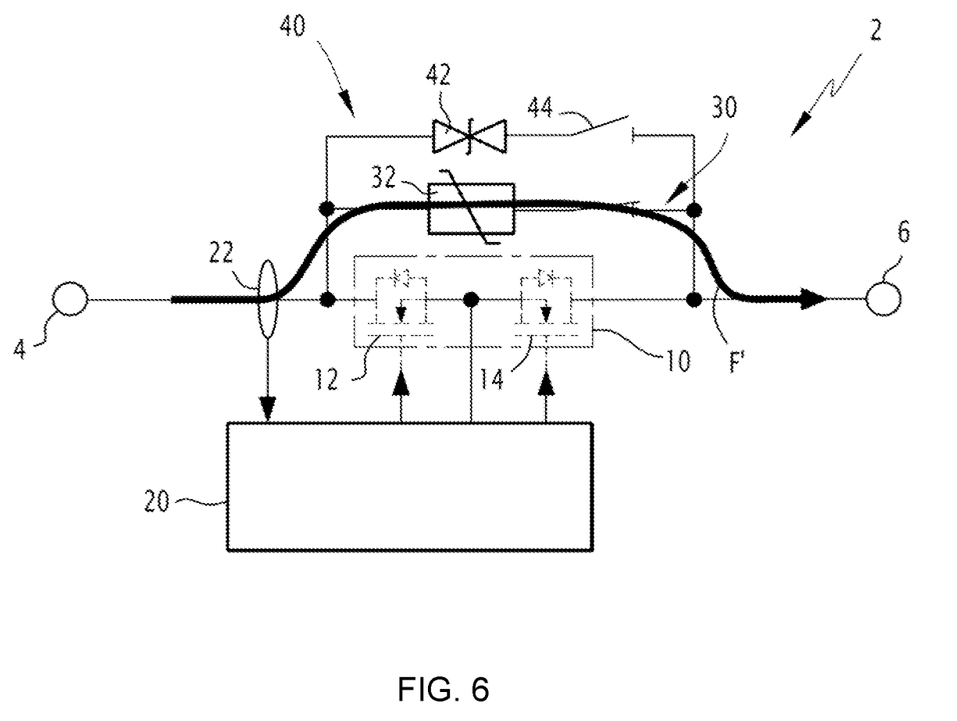
Figure 7:
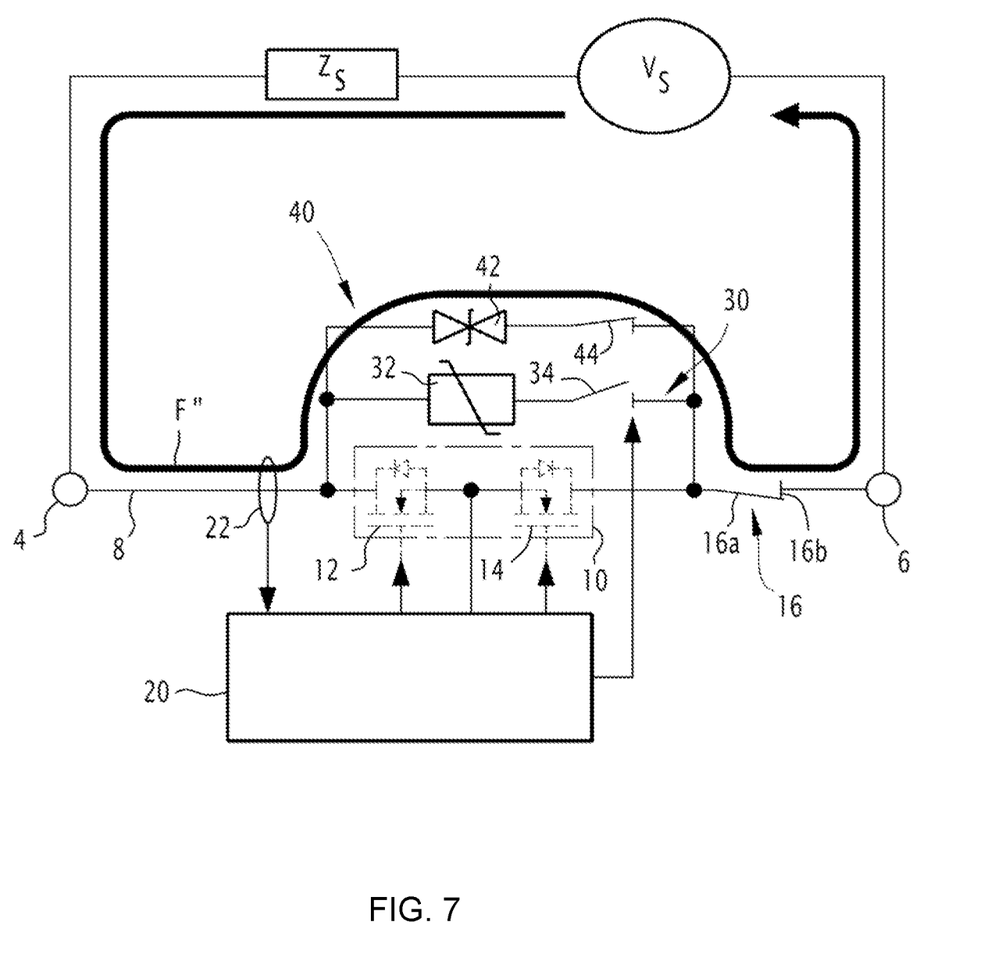

FIGS. 5, 6 and 7 show the operation of the first and second protection systems according to various states of the circuit breaker 2.

The circuit breaker 2 is shown in the "ON" state in FIG. 5.

During nominal operation, when the electric current passing through the main conductor 8 is lower than a cut-off current threshold, the circuit breaker 2 is in the "ON" state, the disconnector 16 is closed, the first switch 34 is closed and, in the embodiment in which it is present, the second switch 44 is open. The main semiconductor switch 10 is in the closed state.

The electric current therefore flows between the connection terminal 4 and the connection terminal 6 via the main switch 10 (transistors 12 and 14 closed) and the disconnector 16. The flow of electric current is indicated schematically by the arrow F.

Advantageously, the first switch 34 is closed in such a way that the first protection system 30 is in operation.

If the cut-off current threshold is exceeded, or upon a remote control received by the controller 20, the circuit breaker changes over from the "ON" state to the "STANDBY" state.

In the case of tripping when the current intensity exceeds the cut-off current threshold, the first protection system 30 is actuated, the electric current flowing through the varistor protection device 32 that is designed to limit the voltage. The main switch 10 changes over to the open state, the disconnector 16 being closed, the first switch 34 being closed and the second switch 44 being open. The flow of electric current is indicated schematically by the arrow F' in FIG. 6.

The circuit breaker 2 is in the passive waiting or "STANDBY" state when, following a remote control or after the overvoltage is limited in the event of breaking being triggered by tripping, the intensity of the electric current is below the cut-off current threshold.

In this state, the main switch 10 is open and the disconnector 16 is closed.

The controller 20 advantageously controls the opening of the first switch 34 of the first protection system and the closing of the second switch 44 of the second protection system.

The opening of the first switch 34 of the first protection system and the closing of the second switch 44 of the second protection system are preferably carried out simultaneously or substantially simultaneously.

Advantageously, the varistor protection device 32 of the first protection system 30 is therefore protected, the current no longer flowing in this first protection system 30, and, in the event of an overvoltage, for example a one-time high overvoltage or a moderate overvoltage from the distribution network, for a given duration, for example an overvoltage of 20% for a duration of the order of one minute, the second protection system 40 is used.

The flow of current is shown schematically by the arrow F" in FIG. 7.

The voltage Vs applied during an overvoltage from the electrical distribution network (for example 4 kV), as well as the impedance Zs of this source, are also shown schematically in this FIG. 7.

When the circuit breaker 2 is in the "OFF" (open) state, upon remote control or via a manual control applied directly to a control member present on the front of a casing encapsulating the circuit breaker, the main switch 10, the disconnector 16, as well as the first switch 34 and the second switch 44, are open.

Figure 8:
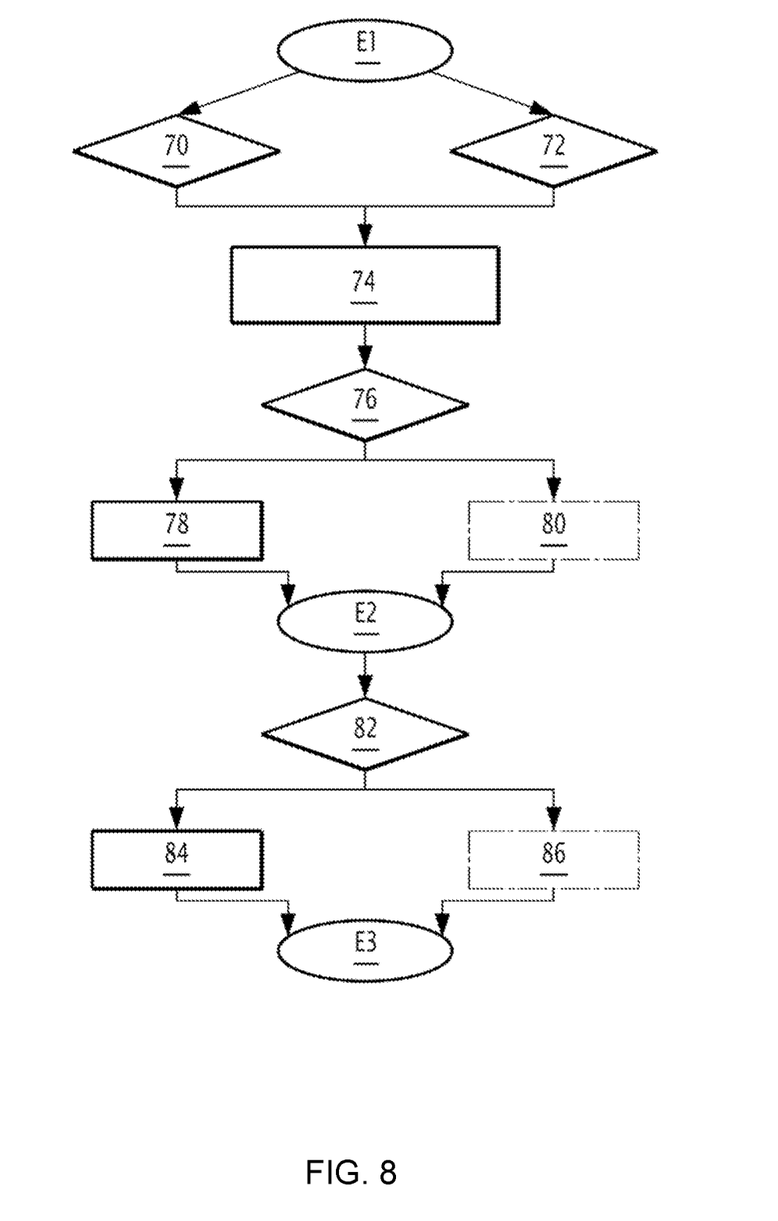
FIG. 8 is a flowchart of a first part of the circuit-breaking method implemented by a circuit breaker according to one embodiment.
Figure 9:
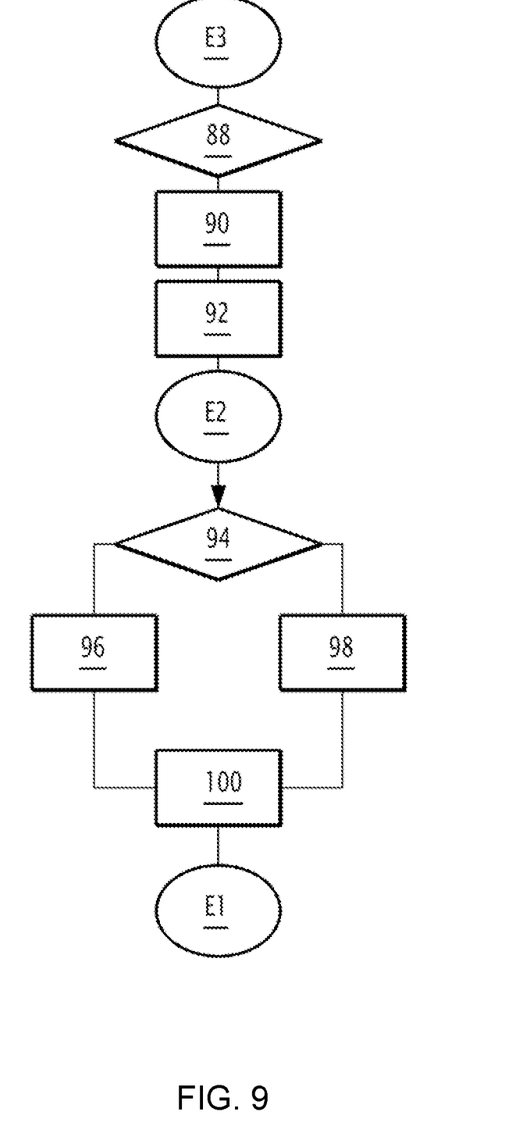
FIG. 9 is a flowchart of a second part of the circuit-breaking method implemented by a circuit breaker according to one embodiment.

FIG. 8 is an overview of the main steps of a first part of the electrical circuit-breaking method implemented by a circuit breaker 2, and FIG. 9 is an overview of the main steps of a second part of the electrical circuit-breaking method implemented by a circuit breaker 2.

In one embodiment, the steps of the method are implemented by the controller 20 of the circuit breaker 2.

Starting from a closed state ("ON"), which is denoted by the reference sign E1 in FIG. 8, of the circuit breaker 2, in which an electric current flows between the connection terminals 4 and 6 during nominal operation, the method comprises monitoring 70 whether the cut-off current threshold is exceeded, consisting of comparing the electric current I flowing in the conductor with the cut-off threshold Ic, as well as monitoring 72 the reception of a remote control to open the circuit breaker 2.

When the monitoring 70 of the cut-off current threshold being exceeded or the monitoring 72 provides a positive response, the method comprises switching 74 of the main switch 10 from the closed state to the open state, inducing a flow of electric current via the first protection system 30.

The flow of the electric current below the cut-off current threshold is monitored (step 76), and when the electric current is below the predetermined cut-off current threshold, the method comprises control 78 to open the first switch 34 of the first protection system 30. In the embodiment in which the second protection system 40 comprises a second switch 44, the method further comprises control 80 to close the second switch 44.

Steps 78 and 80 are carried out simultaneously or substantially simultaneously.

At the end of these steps, the circuit breaker 2 is in the passive waiting state ("STANDBY"), denoted by the reference sign E2 in FIG. 8.

The method then comprises verification 82 of reception of control to open the circuit breaker, this control being able to be manual or remote, and if the verification is positive, opening 84 of the disconnector 16, and, in the event of a second switch 44 being present, opening 86 of the second switch 44, the circuit breaker 2 then being in an open state ("OFF"), denoted by the reference sign E3 in FIG. 8.

In a second part ("return" direction), shown in FIG. 9, the method comprises verification 88 of reception of control to close the circuit breaker, this control being able to be manual or remote, and if the verification is positive, in the event of a second switch 44 being present, control 90 to close the second switch 44 and control 92 to close the disconnector 16. In other words, steps 90 and 92 correspond to the opposite actions of steps 86 and 84, respectively.

The circuit breaker 2 therefore changes over from the open state to the passive waiting state E2.

Then, upon reception of control, or automatically, (step 94), the method comprises control 96 to close the first switch 34 of the first protection system, and, in the event of a second switch 44 being present, control 98 to open the second switch 44.

In other words, steps 96 and 98 correspond to the opposite actions of steps 78 and 80, respectively.

The method also comprises a step 100 of closing the main switch 10, which is opposite to the action of step 74.

The circuit breaker 2 is then in the closed state E1, and, if necessary, the first part of the method described with reference to FIG. 8 applies.

Advantageously, the circuit breaker 2 is protected against overvoltage on account of the first and second protection systems in the "ON" and "STANDBY" operating states. The circuit breaker is therefore protected against overvoltage in all of its operating states on account of the additional presence of the disconnector.

The invention claimed is:

1. An electrical circuit breaker with overvoltage protection, comprising a pair of connection terminals, a main semiconductor switch comprising at least one semiconductor component and a pair of separable contacts forming a disconnector connected in series with the main semiconductor switch between the connection terminals, wherein the electrical circuit breaker comprises a first protection system connected in parallel with the main semiconductor switch, the first protection system comprising a first protection device comprising a varistor and a first switch connected in series with the first protection device, and a second protection system, connected in parallel with said first protection system and said main semiconductor switch, the second protection system comprising a second protection device comprising a transient voltage suppression diode and a second switch connected in series with the second protection device.

2. The electrical circuit breaker according to claim 1, wherein the second switch of the second protection system is of thyristor type, comprising two thyristors connected in parallel and in opposition.

3. The electrical circuit breaker according to claim 1, wherein the second switch of the second protection system comprises at least one JFET field-effect transistor.

4. The electrical circuit breaker according to claim 1, further comprising an electronic controller connected to the main semiconductor switch and a current measurement module configured to measure current flowing between the connection terminals, the electronic controller being configured to switch the main semiconductor switch from a closed state to an open state when the current measured by the current measurement module exceeds a predetermined cut-off current threshold.

5. The electrical circuit breaker according to claim 4, wherein the electronic controller is further configured to control said first switch of the first protection system, and said electronic controller is further configured to control said second switch of the second protection system.

6. The electrical circuit breaker according to claim 1, wherein the first switch of the first protection system comprises two thyristors connected in parallel and in opposition.

7. The electrical circuit breaker according to claim 1, wherein said main semiconductor switch comprises at least one insulated-gate field-effect or bipolar transistor.

8. An electrical circuit-breaking method, implemented by a circuit breaker according to claim 1, comprising, when the circuit breaker is in a closed state in which an electric current flows between the connection terminals,
upon reception of a remote control or when said electric current flowing between the connection terminals exceeds a predetermined cut-off current threshold, switching of the main semiconductor switch from a closed state to an open state, inducing a flow of electric current via the first protection system,
then, when the electric current is lower than the predetermined cut-off current threshold, controlling the first switch of the first protection system to open, and controlling said second switch to close, the circuit breaker then being in a passive waiting state.

9. The electrical circuit-breaking method according to claim 8, further comprising, starting from the passive waiting state of the circuit breaker, upon reception of a remote control or a manual control to open the circuit breaker, opening of the disconnector, and opening of the second switch, the circuit breaker then being in an open state.

10. The electrical circuit-breaking method according to claim 9, further comprising, upon reception of a manual control or a remote control to close the circuit breaker, changing the circuit breaker from the open state to the passive waiting state by closing the disconnector and closing the second switch, then, upon reception of a control or automatically, changing the circuit breaker from the passive waiting state to the closed state, by controlling the main semiconductor switch and the first switch of the first protection system to close, and controlling the second switch to open.

\* \* \* \* \*